June 30, 1931.   T. B. NISBET   1,812,362
TONNEAU WINDSHIELD SUPPORTING MEANS
Filed May 3, 1927   3 Sheets-Sheet 1
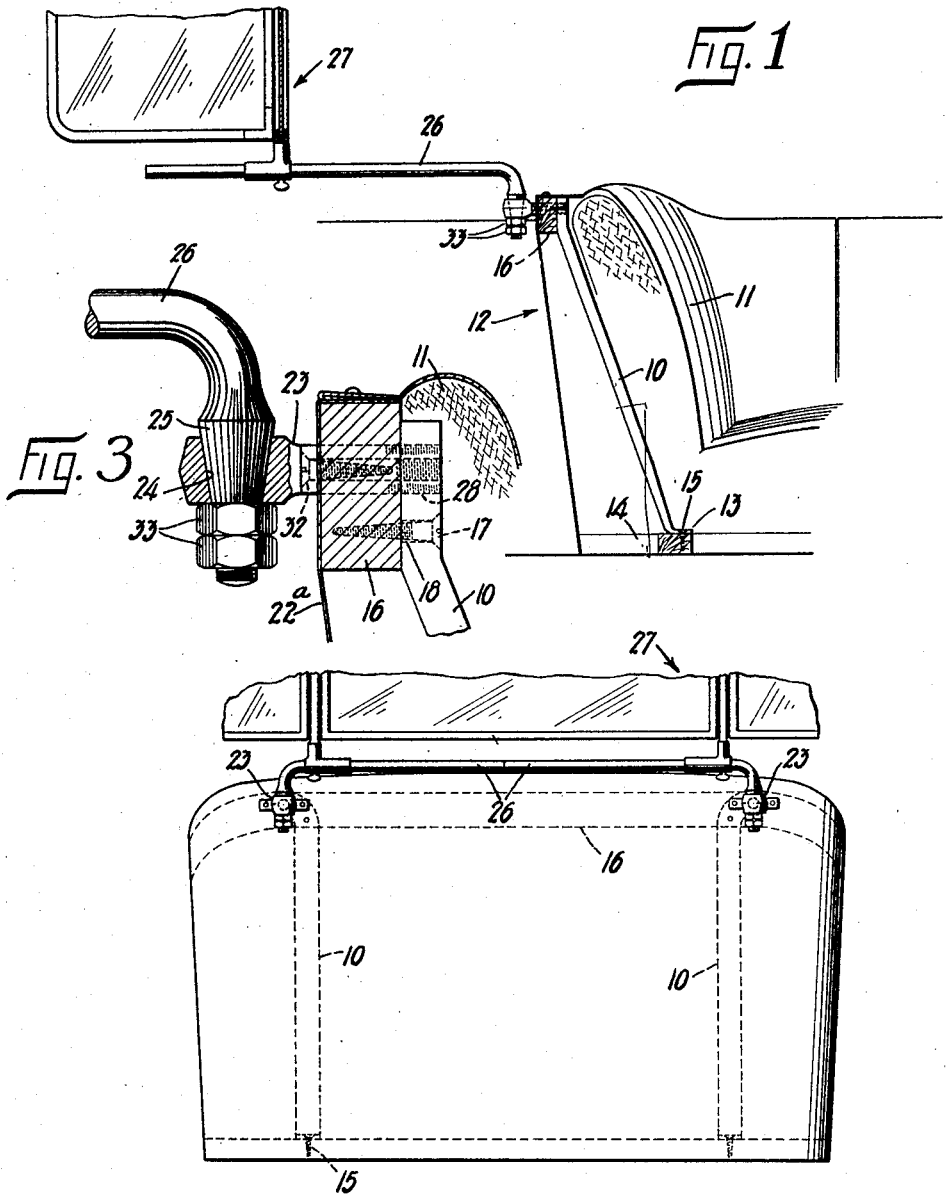
INVENTOR.
Theodore B. Nisbet.
BY
ATTORNEYS.

June 30, 1931. T. B. NISBET 1,812,362
TONNEAU WINDSHIELD SUPPORTING MEANS
Filed May 3, 1927 3 Sheets-Sheet 2

INVENTOR.
Theodore B. Nisbet.
BY
ATTORNEYS.

June 30, 1931.  T. B. NISBET  1,812,362
TONNEAU WINDSHIELD SUPPORTING MEANS
Filed May 3, 1927  3 Sheets-Sheet 3

Inventor
Theodore B. Nisbet.
by
Attorneys

Patented June 30, 1931

1,812,362

UNITED STATES PATENT OFFICE

THEODORE B. NISBET, OF IRVINGTON, NEW YORK

TONNEAU WINDSHIELD SUPPORTING MEANS

Application filed May 3, 1927. Serial No. 188,443.

This invention relates to means adapted for supporting tonneau shields and other attachments for automobiles on the back of one seat of an automobile for use especially by occupants of another seat at the rear thereof and more particularly to such means including parts built in the automobile in the course of manufacture and forming part of the machine as supplied for delivery.

There is a considerable demand for tonneau shields for use with open cars and as no provision has heretofore been made in automobiles as they come from the factory for the attachment of such shields, it is a difficult matter for workmen unaccustomed to their installation to install them properly due to difficulties arising from such factors as the necessary loosening of the upholstery, the fitting of the so-called body irons, and the restoration of the upholstery to substantially its original condition. In present practice the body irons are installed as follows: A shield is placed at the back of the seat with the center of the shield exactly in the center of the seat and the points where the pivots come are marked on the back of the seat. The upholstery is then loosened sufficiently to allow body irons to be slipped down behind the same and measurements for bending the body irons are then taken. The body irons are then bent as closely as possible to the desired shape at the top so as to present the bearing for the tonneau shield pivots as close as practicable to the rear side of the seat back, and are bent at the bottom to form feet to rest on the bottom of the seat beneath the cushion. The irons are then clamped in position and the shield applied thereto. When the fitting of the body irons and shield is completed, the body irons are permanently fastened in position and the upholstery secured in place.

An important object of the present invention is to provide attachment-supporting means especially adapted for supporting tonneau shields and including suitable body irons permanently installed in the automobiles in the regular course of manufacture. A further object of the invention is to provide such fittings which may be used for supporting other attachments, robe rails for example, and which if not used may be arranged so as not to interfere with the use or appearance of the car.

According to one embodiment of the present invention, there are permanently installed body irons for each seat back to which a tonneau shield or the like may be secured. These irons are provided at their lower ends with feet secured to the bottom of the seat and at their upper ends with portions secured to the usual cross bar at the top of the seat and having in said upper ends threaded openings in alignment with openings extending through said bar to the back thereof. The ornamental finish such as upholstery, at the front and back faces of the back of the seat may be installed in the usual manner and there would then be no indications of the body irons although the openings in the bar could readily be found. If desired, there might be holes through the ornamental finish at the rear ends of said openings in said bar and the openings in the upholstery might be closed by the heads of screws having shanks adapted to extend through said holes and to be screwed into said threaded openings. Obviously the arrangement could be such that there would be nothing to interfere with the salability of the car, inasmuch as, if desired, there might be no projections at the back of the seat as put out by the manufacturer. If sockets were provided at the rear of a seat, they might be used for a suitable robe rail and then if a tonneau shield were to be applied it would be necessary only to remove the robe rail. According to another embodiment of the invention, the body irons are provided with threaded shanks extending part way through the top bar and adapted to receive thereover an internally threaded sleeve of a cap of any suitable shape which may include a bearing for a pivot of a tonneau shield or a robe rail support.

Other features and advantages will appear hereinafter upon consideration of the following detailed descriptions and of the drawings, in which:

Fig. 1 is a diagrammatic side elevation partly in section illustrating one form of the present invention applied to an automobile;

Fig. 2 is a rear elevation illustrating the invention;

Fig. 3 is a detail sectional view;

Figure 4:
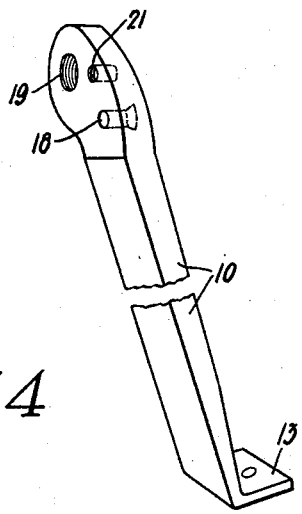
Fig. 4 is a perspective view of one form of a body iron.
Figure 5:
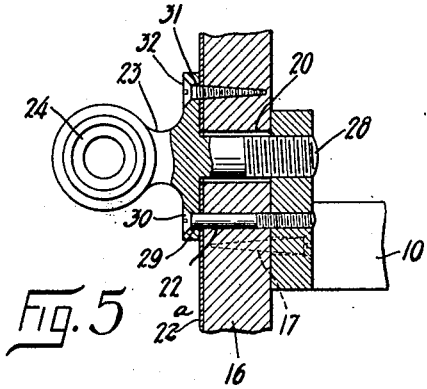
Fig. 5 is detail sectional view illustrating a bearing for a tonneau shield secured to the top of the body iron.
Figure 6:
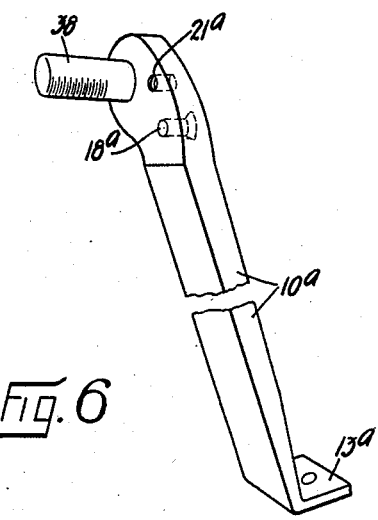
Fig. 6 is a perspective view of another form of body iron.
Figure 7:
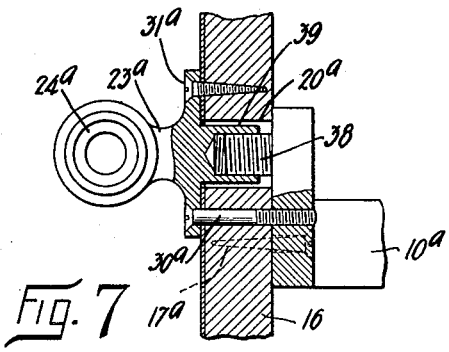
Fig. 7 is a sectional view illustrating the upper part of the body iron of Fig. 6 with a suitable pivot bearing secured thereto.

According to one form of the invention, as illustrated in Figs. 1 to 4 inclusive, the automobile is equiped at the factory with body irons 10 positioned back of the upholstery 11 of the seat back 12 and having feet 13 secured to the bottom 14 of the seat by screws 15. At their upper ends the body irons 10 are bent slightly forward to fit against the front face of a bar 16 in the top of the seat and may be secured to said bar by screws 17 passing through suitable openings 18 in the body irons and into the bar which is preferably of wood. The upper ends of the body irons are expanded to serve as suitable fastening means for purposes later to be described. As illustrated in Figs. 2 and 4, this expansion is effected by laterly offsetting the upper ends of the body irons in such a way as to conform with the seat structure. Each of the body irons 10 is provided at its upper end in front of the bar 16 with a threaded opening 19 substantially in register with an opening 20 (see Fig. 5) extending through the bar 16 to the rear face thereof and with another threaded opening 21 in alignment with a threaded opening 22 also extending through the bar 16 to the rear face thereof.

In the car as delivered the upholstery fabric 22a may completely cover said openings 20 and 22 at the rear. In this case, when it is desired to apply fixtures such as brackets 23 having sockets 24 to receive the conical pivots 25 of rods 26 of a tonneau shield 27 as illustrated in Figs. 1, 2 and 3, the openings in the bar 16 can easily be found. Then the threaded shanks 28 of the brackets 23 are inserted in the openings 20 and screwed into the upper ends of the body irons 10 to the position shown clearly in Figs. 2 and 5. An opening 29 in the head of the bracket 22 is brought into alignment with the opening 22 and a machine screw 30 is inserted through said openings 29 and 22 and screwed into the threaded opening 21 at the upper end of the body iron thus securing the bracket 23 against rotation and providing a strong connection between the bracket 22, the bar 16 and the body iron 10. The bracket 23 is also provided at the side opposite the hole 29 with another hole 31 through which a wood screw 32 may be inserted and screwed into the bar 16.

A tonneau shield 27 may then be attached to the seat 12 by inserting the conical pivots 25 into the sockets 24 and securing the bars 26 in position by nuts 33 threaded on extensions of the conical pivots 25 as shown in Fig. 3.

Figure 8:
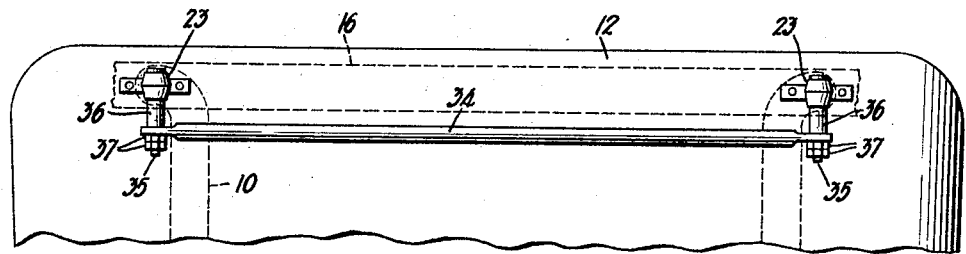
Fig. 8 is a fragmentary rear view illustrating a robe rail supported from said body irons.

The brackets 23 may also be used for supporting a robe rail 34 as illustrated in Fig. 8. Suitably headed bolts 35 are inserted from above through the sockets in the brackets 23 and passed through perforations in the ends of the robe rail 34, suitable spacers 36 being used, if desired, to position the robe rail 34 at the proper height, and the robe rail may be secured in position by nuts 37 threaded on the lower ends of the bolts 35.

In carrying out the invention in another form, use may be made of body irons 10a similar to body irons 10 but differing therefrom by the provision at their upper ends of rearwardly extending threaded shanks 38 instead of the threaded openings 19. The body irons 10a may be provided with threaded openings 21a, openings 18a, and feet 13a in correspondence with the construction of irons 10. The irons 10a are attached by screws 17a to the bar 16 which, however, is provided with an opening 20a considerably larger than the threaded shank 38. To cooperate with the body irons 10a use is made of brackets 23a which have sockets 24a similar to the sockets 24 but are provided with internally threaded sleeve portions 39 to screw on said threaded shanks 38 of the body irons 10a. The bracket 23a is then secured in position by a screw 30a extending through the head of the bracket 23a and the bar 16 and screwed into the threaded opening 21a of the body iron 10a, and by a wood screw 31a passing through an opening in the head of the bracket and screwed into the bar 16.

Figure 9:
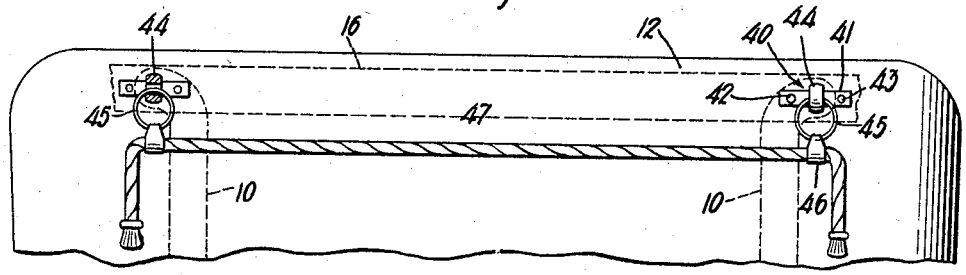
Fig. 9 is a view illustrating a flexible robe rail supported by the body irons.

As already suggested, attachments other than brackets 23 and 23a may be applied to the back of the seat 12 and secured to the body irons. As illustrated in Fig. 9, attachments 40 are applied at the back of the seat 12 and attached to the body irons 10. These attachments 40 include cross bars 41 attached at one end by screws 42 extending through the bar 16 and into the corresponding threaded openings in the body irons 10 and at their other ends are secured by screws 43 to the bar 16. Each of the attachments 40 is provided with an eye 44 through which passes a ring 45 connected with a band 46 through which passes a flexible robe rail 47.

Figure 10:
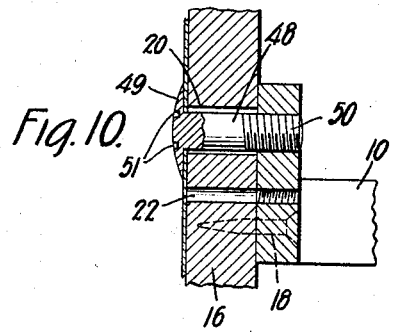
Fig. 10 is a fragmentary sectional view illustrating the use of a screw having a flat head to close the openings at the rear of a seat back.

As illustrated in Fig. 10, if there are openings in the upholstery at the rear of the openings 20 and it is not desired to secure any attachment to the body iron through the openings 20, screws 48 having heads 49 of sufficient diameter to cover the openings may be inserted through the openings 20 and their threaded shanks 50 screwed into the threaded openings 19. In this arrangement the heads 49 of the screws 48 are preferably nickel plated so as to have an attractive appearance and are provided with suitable slots or depressions 51 to facilitate their application and removal.

It will be evident that by use of the present invention cars may readily be equipped in the factory for the easy attachment later of additional equipment such as a tonneau shield and without impairing in any way the appearance or salability of cars sold to persons who do not desire such equipment. Obviously such body irons must be accurately positioned but the necessary accuracy may readily be obtained by use of suitable templates.

The foregoing detailed description has been given for clearness of understanding, and no undue limitation should be deduced therefrom but the appended claims should be construed as broadly as possible, in view of the prior art.

I claim:

1. In an automobile having a seat having a bottom and a back with a frame comprising openings extending from front to rear at the top thereof and at opposite ends of the back and upholstery at the front of said frame, the combination of said frame, body irons behind the upholstery in said back with their lower ends secured to the seat at the bottom thereof and with their upper ends against said frame at the front of said openings, said upper ends having threaded parts to register with said openings, and attachments to engage said frame at the rear and having threaded parts adapted to project into said openings and to be screwed to said threaded parts of said body irons.

2. In an automobile having a seat with a back including a frame, the combination with said frame, of tonneau shield body irons installed in the car when built, each of said body irons being secured to said frame against the front side thereof and having a screw threaded portion in register with an opening in the frame, a tonneau shield socket to engage said frame at the back and having a screw threaded part to cooperate with the screw threaded portion of the body iron and act both to hold the socket member on the frame and to assist in holding the body iron in position, and separate means to lock said socket member to said frame and prevent turning of the socket member and consequent loosening thereof.

New York, N. Y., May 2, 1927.

THEODORE B. NISBET.